Patented Oct. 12, 1926.

1,603,155

UNITED STATES PATENT OFFICE.

EINAR VIGGO SCHOU, OF PALSGAARD, NEAR JUELSMINDE, DENMARK.

MANUFACTURE OF EMULSIFYING INGREDIENTS OR MATERIALS AND EMULSIONS THEREOF.

No Drawing. Application filed October 14, 1921. Serial No. 507,690.

In emulsions as generally produced the watery portion constitutes the external phase and the oily portion the internal phase, emulsions of this kind having the physical properties of watery solutions in that they are easily blended with and dissolved in water but not in oil.

According to the present invention I produce an emulsion which is soluble in oil and in which the watery portion thereof is distributed throughout and finely divided within the oily portion.

For the production of emulsions of this kind I prepare an oily emulsifying material having viscous, tough and elastic properties. These properties I have found in oxidized or polymerized oils, such as oxidized linseed oil or other oils of a drying or half-drying character, and it is possible with such elastic oils and without the use of chemicals of any kind to make stable emulsions containing the watery portion in a uniformly distributed and finely divided state. Emulsions prepared from such oils are particularly suitable for painting, priming or impregnating purposes or the like, as described in my co-pending application No. 507,691 (Case 1), where the drying properties of the oxidized oil is of advantage to the product. Oxidized oils are, however, unsuitable for use in cases where the oily emulsifying material should be of a neutral character, non-drying and not inclined to become rancid, and it is one object of the present invention to produce an oily emulsifying material which fulfills these last mentioned requirements.

According to the present invention, and instead of directly producing an oxidized oil, I first produce a gelatinated oil with very pronounced viscous, tough and elastic properties (which I term oil soluble gelatinated oil) and thereafter dissolve this gelatinated oil in fresh oil. It is possible in this way to produce an oleaginous material, which is equal to oxidized linseed oil as regards emulsifying properties, and which at the same time is of a neutral character, is non-drying, and possesses excellent keeping properties. I am also able in this manner and without the use of chemicals of any kind to prepare oleaginous materials, which are in every way suitable for use in the production of articles of food or the like, as they are practically tasteless and without flavour. If used alone and without further treatment, that is to say without emulsification, such oleaginous materials constitute an edible alimentary which is suitable for use and sale inter alia as a substitute for butter or lard for baking purposes.

In the production of oil soluble gelatinated oil according to my present invention, I have found that I can use most fatty oils containing linolic acid or linolenic acid, such as linseed oil, soya oil, cottonseed oil, sesame oil, groundnut oil or others, which through suitable treatment are made to gelatinate.

The gelatination may be carried out in various manners for instance through continued heating at a suitable temperature (polymerizing), through polymerizing after oxidizing, this latter being carried out at a somewhat lower temperature or at ordinary temperature, or through simultaneous polymerizing and oxidizing. The most suitable polymerizing temperature is 250° centigrade or thereabout, but varies somewhat for the different kind of oils. It is important during the process to maintain exactly and constantly the polymerizing temperature most suitable for the particular oils used, as the solubility and other properties of the gelatinated oils are dependent thereon. It is also important completely to remove the products of decomposition, caused by the previous or simultaneous oxidation.

The following may serve as an example of one process of carrying out the present invention.

100 parts of refined soya oil are heated to a temperature of 250° centigrade and while constantly stirring the oil heated air is blown therethrough, the temperature being mantained until gelatination sets in. The duration of the process is dependent on the quantity and the temperature of the air used. The products of decomposition, in particular free fatty acid, if any, are carried away by the distilling effect, caused by the high temperature of the process.

In some cases the products of distillation may amount to from 10 to 15 per cent of the weight of the oil and may through suitable arrangements be recovered and utilized for other purposes.

As soon as gelatination sets in, the air blast is stopped. The gelatinated oil is then cooled down to 100° centigrade or thereabout and there is now added about 300 parts of fresh oil of a suitable kind, such as cottonseed oil, groundnut oil or sesame oil. The stirring of the blend is continued at a temperature of from 100° to 120° centigrade, until the gelatinated oil is completely dissolved in the fresh oil, after which the blend is cooled down to substantially atmospheric temperature and the oleaginous material possessing emulsifying properties is ready for use.

Although good results have been obtained with the process carried out in the manner described, I do not confine myself to this example only, and the process may be varied in accordance with the materials used and the purpose for which the oleaginous material is to be employed.

For the preparation of an emulsion which is soluble in oil the following may serve as an example:—

To 100 parts of an oil soluble gelatinated oil prepared in any of the above mentioned manners is added gradually and while being vigorously stirred, 300 parts or thereabout of pure water or a watery solution of suitable materials such as animal glue, vegetable glue, gum, casein or the like. The addition may be made at the rate of about one part of the watery material to about 12 parts of the oily material per minute.

In emulsions prepared in this manner it is possible to obtain directly, only through the dispersing force of the oil and without further treatment, a very minute division of the watery globules, say from 1 μ to 5 μ or less. The division is so fine that the "Brown" movement of the watery globules is distinctly visible under the microscope.

An emulsion of this description has many advantages as compared with emulsions hitherto prepared for similar purposes. Methods of preparing and utilizing emulsions of this character for painting, priming, impregnating or like purposes are described in my co-pending patent application (Case I), while their utilization as or in connection with the manufacture of margarine or edible fats is described in my co-pending patent application Serial No. 507,689, filed October 14, 1921.

The emulsion is permanent in a very high degree and the water will not separate from the emulsion even after the lapse of a considerable length of time. Moreover, the emulsion can be prepared without the use of chemicals of any kind and even the small quantity of sticky and viscous substance, which is above referred to as being added to the aqueous portion of the emulsion can be dispensed with, as I have discovered that oleaginous materials possessing viscous, tough and elastic properties will form an emulsion with pure water.

I may use one oil or a mixture of two or more oils, with each oil containing either linol or linolenic acid or both of said acids. I have used the general expression "oils of the drying type" which is to be interpreted as meaning an oil containing either linol or linolenic acid or both or a mixture of oils containing such acids.

I claim:—

1. A process for producing emulsions of the water in oil type, consisting in dissolving in the oily or fatty constituents an oil soluble colloid formed by polymerizing oils of the drying type, and dispersing the watery constituent in the oily or fatty one, until reaching the state of permanent dispersion.

2. Oily emulsions in which a watery portion is permanently dispersed as inner phase in oils or melted fats containing an oil soluble colloid which consists of polymerized oils of the drying type.

3. The process of treating oils to form an oil soluble colloid which comprises heating an oil to a temperature of 250° centigrade while constantly stirring the oil, blowing heated air through the oil and maintaining the temperature constant until an oil soluble colloid is formed, stopping the air blast, cooling the oil soluble colloid to substantially 100° centigrade, adding fresh vegetable oil in the proportions of 300 parts of vegetable oil to 100 parts of the oil soluble colloid, raising the temperature to substantially 120° centigrade, and maintaining at such temperature until the colloid is completely dissolved in the fresh oil, cooling the blend to substantially atmospheric temperature.

4. The process of treating oils to form an oil soluble colloid which comprises heating an oil to a temperature of 250° centigrade while constantly stirring the oil, blowing heated air through the oil and maintaining the temperature constant until an oil soluble colloid is formed, stopping the air blast, cooling the colloid to substantially 100° centigrade, adding fresh vegetable oil in the proportions of 300 parts of vegetable oil to 100 parts of the colloid, raising the temperature to substantially 120° centigrade, maintaining at such temperature until the colloid is completely dissolved in the fresh oil, cooling the blend to substantially atmospheric temperature, and slowly and vigorously stirring water into the blend in the proportions of 300 parts of water to 100 parts of the blend.

5. A step in the process of forming an emulsifying oil which consists in heating the oil to a temperature of 250° centigrade, passing heated air through the same until the oil forms an oil soluble colloid substance, and adding sufficient oil to the colloid to dissolve the same.

6. The process of treating oils which comprises heating oil to a temperature of 250° centigrade, passing heated air through the same until the oil forms an oil soluble colloid, cooling the oil to a temperature of substantially 100° centigrade and then stirring fresh oil into the colloid and slightly raising the temperature of said colloid until the colloid is dissolved.

7. The process of forming an emulsifying oil which comprises stirring fresh oil into an oil soluble colloid at a temperature of substantially 120° centigrade, then slowly and vigorously stirring water into the blend.

8. An emulsion comprising 100 parts of gelatinized oil dissolved in 300 parts of pure oil and a watery portion which is finely divided in the oil mixture and uniformly distributed throughout the same in the proportions of 300 parts of water to 100 parts of the oil mixture.

9. An emulsion comprising a gelatinized oil and sufficient pure oil to dissolve the gelatinized oil, and a watery portion uniformly distributed throughout the oil mixture to produce in the oil mixture a consistency equal to that of butter.

In testimony whereof I affix my signature.

EINAR VIGGO SCHOU.